US009896194B2

(12) United States Patent
Georgin

(10) Patent No.: US 9,896,194 B2
(45) Date of Patent: Feb. 20, 2018

(54) AUTOBRAKING SYSTEM WITH COURSE TRAJECTORY ADJUSTMENT

(71) Applicant: Goodrich Corporation, Charlotte, NC (US)

(72) Inventor: Marc Georgin, Dayton, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 120 days.

(21) Appl. No.: 14/288,958

(22) Filed: May 28, 2014

(65) Prior Publication Data
US 2015/0344129 A1 Dec. 3, 2015

(51) Int. Cl.
| | |
|---|---|
| G01C 23/00 | (2006.01) |
| G05D 1/00 | (2006.01) |
| G05D 3/00 | (2006.01) |
| B64C 25/42 | (2006.01) |
| B64C 25/48 | (2006.01) |
| B60T 7/04 | (2006.01) |
| B60T 7/12 | (2006.01) |
| B60T 8/17 | (2006.01) |
| B60T 13/74 | (2006.01) |
| B60T 17/22 | (2006.01) |
| B60T 8/1755 | (2006.01) |

(52) U.S. Cl.
CPC ............ *B64C 25/426* (2013.01); *B60T 7/042* (2013.01); *B60T 7/12* (2013.01); *B60T 8/1703* (2013.01); *B60T 8/1755* (2013.01); *B60T 13/741* (2013.01); *B60T 17/221* (2013.01); *B64C 25/48* (2013.01)

(58) Field of Classification Search
CPC ....... B64C 25/42; B64C 25/46; B64C 25/426; B64C 25/48; B60T 8/176; B60T 8/1703; B60T 7/12; G01C 23/00; G05D 1/0202
USPC ......... 701/3, 71; 303/126; 244/111, 183, 184
See application file for complete search history.

(56) References Cited

U.S. PATENT DOCUMENTS

| | | | | |
|---|---|---|---|---|
| 4,367,529 A | * | 1/1983 | Masclet | B60T 8/1703 303/126 |
| 4,482,961 A | * | 11/1984 | Kilner | G05D 1/0083 244/183 |
| 2013/0245907 A1 | * | 9/2013 | McKay | B60T 8/1703 701/71 |

OTHER PUBLICATIONS

Extended European Search Report dated Jan. 27, 2016 in European Application No. 15168857.9.

* cited by examiner

*Primary Examiner* — Isaac G Smith
(74) *Attorney, Agent, or Firm* — Snell & Wilmer L.L.P.

(57) ABSTRACT

Methods and systems are provided for improved autobraking systems for aircraft. Such systems and methods include a pedal balance controller configured to receive one of a yaw angle, a yaw speed, and a wheel speed, and an autobrake pedal executive module configured to send an autobrake left pedal command and an autobrake right pedal command to a pedal executive module, wherein the pedal executive module is configured to execute a pedal command. These systems and methods may assist a pilot in maintaining a desired course during autobraking.

20 Claims, 2 Drawing Sheets

US 9,896,194 B2

AUTOBRAKING SYSTEM WITH COURSE TRAJECTORY ADJUSTMENT

FIELD

The present disclosure relates to aircraft autobraking systems, and more specifically, to autobraking systems with course trajectory adjustment capabilities.

BACKGROUND

Modern aircraft are typically equipped with an autobraking system. During a landing phase or a Rejected Take-Off ("RTO") event, a pilot may engage an autobraking system to assist with decreasing the speed of the plane. The autobraking system may also allow the pilot to focus on other aspects of achieving a safe landing or successful RTO event. When autobraking is engaged, the aircraft may veer off a desired course. Therefore, systems and methods for improved autobraking systems for aircrafts may be beneficial, including in assisting a pilot on maintaining a desired course during a landing or RTO event.

SUMMARY

An aircraft autobraking system comprises an autobrake controller, a pedal balance controller configured, and an autobrake pedal executive module configured receive at least one autobrake pedal correction factor from the pedal balance controller and an initial autobrake command from the autobrake controller, and to send an autobrake left pedal command and an autobrake right pedal command to a pedal executive module, wherein the pedal executive module is configured to execute a pedal command. The autobrake controller may be configured to receive one of an aircraft acceleration feedback and an aircraft acceleration target. The aircraft acceleration target may be set by a cockpit device. The autobrake controller may be configured to send the autobrake pedal command as a single autobrake pedal command. The at least one autobrake pedal command may be a single autobrake pedal command. The pedal balance controller may be configured to receive at least one of a yaw angle, a yaw speed, and a wheel speed. The pedal executive module may be configured to receive a pilot left pedal command and a pilot right pedal command. The autobrake left pedal command and the autobrake right pedal command may be calculated to maintain a desired course of the aircraft.

A method for autobraking an aircraft comprises receiving, at an autobrake controller, an aircraft acceleration target, receiving at a pedal balance controller, one of a yaw angle, a yaw speed, and a wheel speed, receiving at an autobrake pedal executive module, an initial autobrake pedal command from the autobrake controller, sending, from the pedal balance controller, one or more autobrake pedal correction factors to the autobrake pedal executive module, sending from the autobrake pedal executive module, an autobrake left pedal command and an autobrake right pedal command to the pedal executive module, and executing, by a pedal braking controller, a pedal command. The method may further comprise receiving, at the autobrake controller, an aircraft acceleration feedback. The aircraft acceleration target may be received from a cockpit device. The pedal command may comprise sending a signal to an electric brake system. The pedal command may comprise sending a signal to a hydraulic brake system. The autobrake left pedal command and the autobrake right pedal command may be calculated to maintain a desired course of the aircraft.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step.

Figure 1:
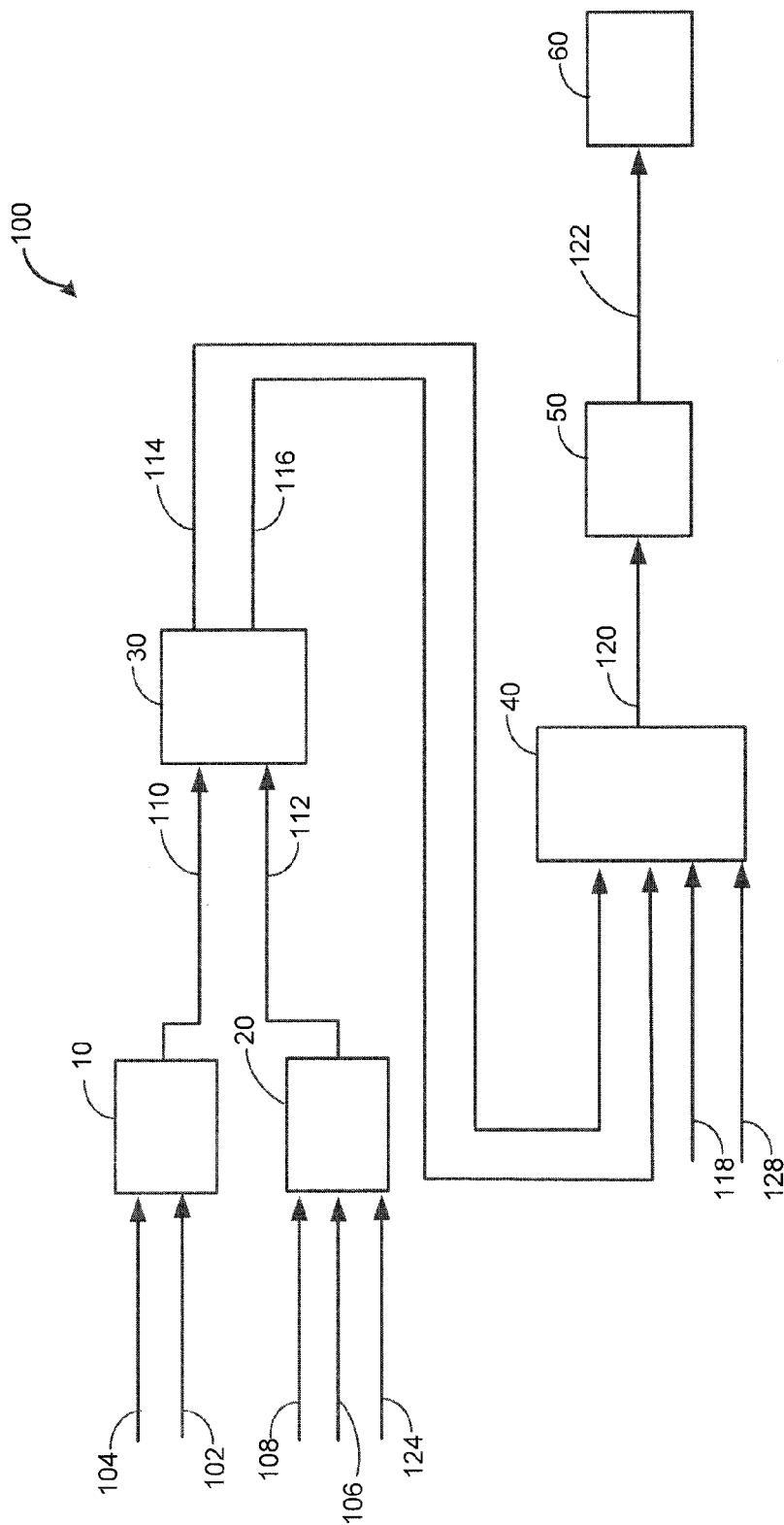
FIG. 1 illustrates a schematic diagram of an aircraft autobraking system in accordance with the present disclosure.

With reference to FIG. 1, an aircraft autobraking system 100 is illustrated. In various embodiments, aircraft autobraking system 100 is configured to automatically decelerate the aircraft (not shown) during a landing phase or RTO event. In further embodiments, aircraft autobraking system 100 may decelerate the aircraft while maintaining a steady course during a landing phase or RTO event. For example, external factors such as wind, or operating conditions of components of the aircraft such as imbalanced reverse thrusters and/or differing characteristics of individual braking systems, may cause the aircraft to stray off a desired course. In such conditions, aircraft autobraking system 100 may assist in maintaining a desired course of the aircraft during deceleration. A desired course may comprise, for example, a straight line, notwithstanding environmental factors such as wind and ground conditions. Further, aircraft autobraking system 100 may be used to control, for example two or more aircraft wheels. In various embodiments, aircraft autobraking system 100 controls a left side wheel and a right side wheel. In further embodiments, aircraft autobraking system 100 may control more than two wheels. Any number of wheels controlled by aircraft autobraking system 100 is within the scope of the present disclosure.

In various embodiments, aircraft autobraking system 100 comprises an autobrake controller 10. Autobrake controller 10 may be configured, for example, to receive an aircraft acceleration target 102. In various embodiments, aircraft acceleration target 102 is a target selected and set by a pilot by input into a cockpit device. A cockpit device may be any device housed in a cockpit of an aircraft and, in various embodiments, may be configured to receive input from a pilot. Further, autobrake controller 10 may be configured, for example, to receive an aircraft acceleration feedback 104. In various embodiments, autobrake controller 10 is configured to calculate and transmit an initial autobrake pedal command 110.

Aircraft autobraking system 100 may further comprise, for example, a pedal balance controller 20. In various embodiments, pedal balance controller 20 is configured to receive data such as, for example, aircraft yaw angle 108, aircraft yaw speed 106, and wheel speed 124, among other data. In various embodiments, pedal balance controller 20 may calculate and transmit autobrake pedal correction factors 112. Correction factors 112 may, for example, be used to modify initial autobrake pedal command 110 to accommodate environmental conditions and data (such as yaw angle 108, yaw speed 106, and wheel speed 124) and assist in maintaining a desired course of the aircraft.

In various embodiments, aircraft autobraking system 100 comprises an autobrake pedal executive module 30. For example, autobrake pedal executive module 30 may receive initial autobrake pedal command 110 from autobrake controller 10. Further, autobrake pedal executive module 30 may receive autobrake pedal correction factors 112 from pedal balance controller 20. In various embodiments, autobrake pedal executive module 30 may use initial autobrake pedal command 110 and autobrake pedal correction factors 112 to calculate and transmit multiple individual pedal commands. For example, autobrake pedal executive module 30 can calculate and transmit an autobrake left pedal command 114 and an autobrake right pedal command 116.

Aircraft autobraking system 100 may further comprise, for example, a pedal executive module 40. In various embodiments, pedal executive module 40 is configured to receive autobrake left pedal command 114 and autobrake right pedal command 116. Further, pedal executive module 40 may receive a pilot left pedal input 118 and a pilot right pedal input 128 from a pilot. For example, pilot left pedal input 118 and pilot right pedal input 128 may be transmitted by the pilot by depressing the brake pedals. In various embodiments, pedal executive module 40 calculates and transmits a pedal command 120.

In various embodiments, aircraft autobraking system 100 comprises a pedal braking controller 50. For example, pedal braking controller 50 may be configured to receive pedal command 120 from pedal executive module 40. In various embodiments, pedal braking controller 50 is configured to calculate and transmit a braking command 122 to a braking system 60. The braking system may comprise, for example, an electric, a hydraulic, or a hybrid electric-hydraulic braking system.

Figure 2:
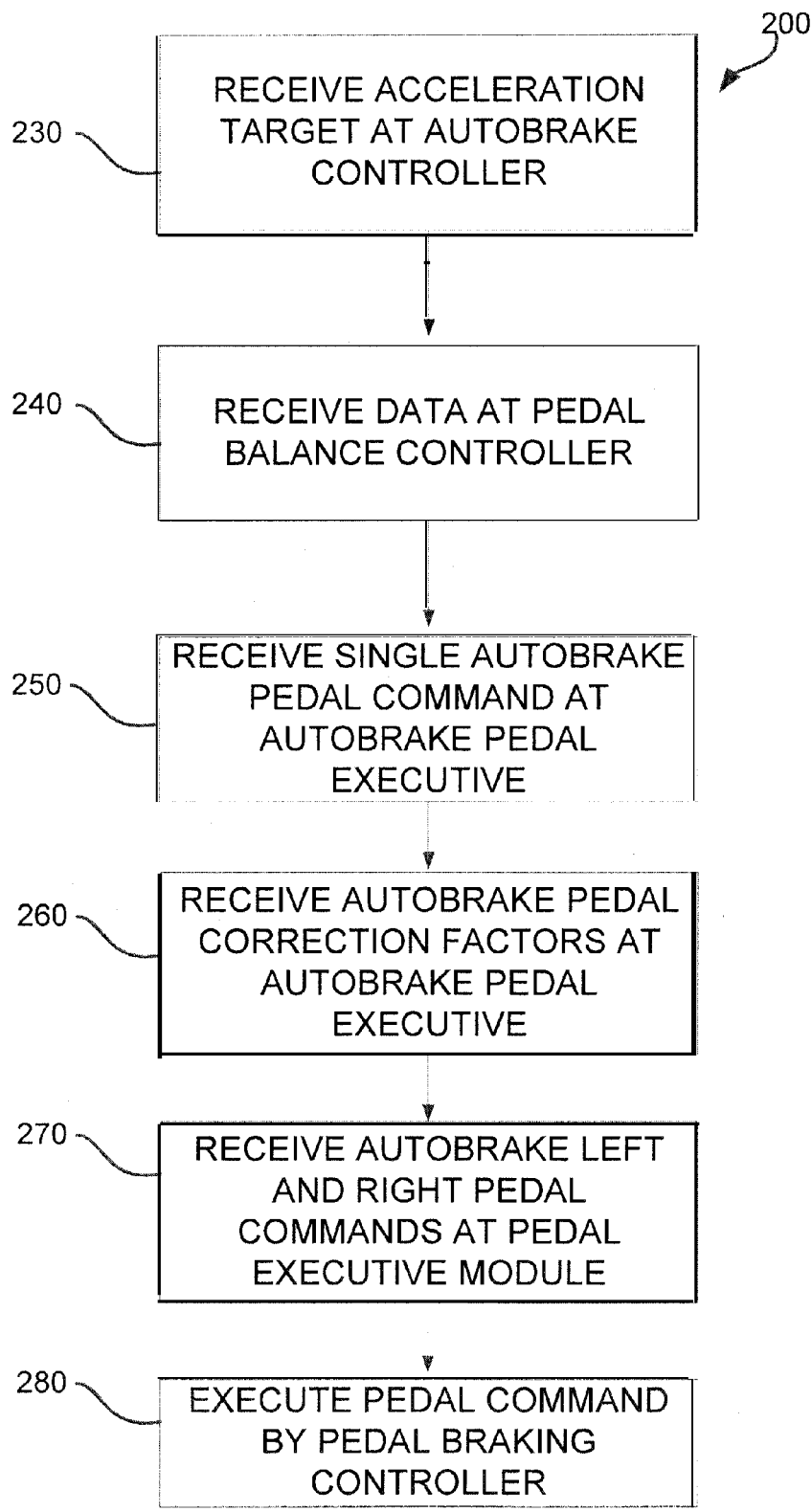
FIG. 2 illustrates a method of aircraft autobraking in accordance with the present disclosure.

With reference to FIG. 2, an aircraft autobraking method 200 is illustrated. As previously discussed, in various embodiments, autobraking method 200 may automatically decelerate the aircraft during a landing phase or RTO event while maintaining a steady course. In various embodiments, autobraking method 200 may comprise receiving an acceleration target at autobrake controller in step 230. Step 230 may comprise, for example, providing an acceleration target selected and set by a pilot in a cockpit device to an autobrake controller. In various embodiments, step 230 may further comprise providing an aircraft acceleration feedback to the autobrake controller.

Autobraking method 200 may comprise, for example, receiving data at pedal balance controller in step 240. In various embodiments, step 240 may comprise receiving data such as aircraft yaw angle, aircraft yaw speed, and/or wheel speed at the pedal balance controller.

In various embodiments, autobraking method 200 may comprise receiving initial autobrake pedal command at autobrake pedal executive in step 250. For example, step 250 may comprise providing an initial autobrake pedal command generated by the autobrake controller to the autobrake pedal executive module.

Autobraking method 200 may comprise, for example, receiving autobrake pedal correction factors at autobrake pedal executive in step 260. In various embodiments, step 260 may comprise providing pedal correction factors generated by the pedal balance controller to the autobrake pedal executive module.

In various embodiments, autobraking method 200 may comprise receiving autobrake left and right pedal commands at pedal executive module in step 270. For example, step 270 may comprise providing a left pedal command and a right pedal command generated by the autobrake pedal executive module to a pedal executive module. Step 270 may further comprise, for example, providing a pilot left pedal input 118 and a pilot right pedal input 128.

Autobraking method 200 may comprise, for example, executing a pedal command by pedal braking controller in step 280. Step 280 may comprise, for example, sending a pedal command from the pedal executive module to the pedal braking controller. In various embodiments, the pedal braking controller sends a command to a braking system to initiate, maintain, and/or adjust the braking level of the braking system. The braking system may comprise, for example, an electric, a hydraulic, or a hybrid electric-hydraulic braking system.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aircraft autobraking system comprising:
    an autobrake controller configured to send an initial single autobrake pedal command based on an aircraft acceleration target, wherein the initial single autobrake pedal command is generated by the autobrake controller independent from a pilot pedal input;
    a pedal balance controller configured to send an autobrake pedal correction factor;
    an autobrake pedal executive controller configured to receive at least one of the autobrake pedal correction factor from the pedal balance controller or the initial single autobrake pedal command from the autobrake controller;
    the autobrake pedal executive controller configured to send an autobrake left pedal command and an autobrake right pedal command to a pedal executive controller, wherein the autobrake left pedal command and the autobrake right pedal command are independent from the pilot pedal input; and
    a pedal braking controller configured to execute a pedal command received from the pedal executive controller.

2. The system of claim 1, wherein the autobrake controller is configured to receive an aircraft acceleration feedback, wherein the initial single autobrake pedal command is based on the aircraft acceleration feedback.

3. The system of claim 2, wherein the aircraft acceleration target is set by a cockpit device.

4. The system of claim 1, wherein the autobrake controller is configured to send the initial single autobrake pedal command to the autobrake pedal executive controller.

5. The system of claim 1, wherein the at least one autobrake pedal correction factor is a plurality of autobrake pedal correction factors.

6. The system of claim 5, wherein the pedal balance controller is configured to receive at least one of a yaw angle, a yaw speed, or a wheel speed.

7. The system of claim 1, wherein the pedal executive controller is configured to receive the pilot pedal input, the pilot pedal input comprising a pilot left pedal input and a pilot right pedal input.

8. The system of claim 1, wherein the autobrake left pedal command and the autobrake right pedal command are calculated to maintain a desired course of the aircraft.

9. A method for autobraking an aircraft comprising:
    receiving, at an autobrake controller, an aircraft acceleration target;
    receiving, at a pedal balance controller, at least one of a yaw angle, a yaw speed, or a wheel speed;
    generating, by the autobrake controller, an initial single autobrake pedal command, the initial single autobrake pedal command being generated independent from a pilot pedal input and the initial single autobrake pedal command being based on the aircraft acceleration target;
    receiving, at an autobrake pedal executive controller, the initial single autobrake pedal command from the autobrake controller;
    sending, from the pedal balance controller, an autobrake pedal correction factor to the autobrake pedal executive controller, the autobrake pedal correction factor being independent from the pilot pedal input;
    sending, from the autobrake pedal executive controller, an autobrake left pedal command and an autobrake right pedal command to a pedal executive controller, the autobrake left pedal command and the autobrake right pedal command independent from the pilot pedal input;
    sending, from the pedal executive controller, a pedal command based on the autobrake left pedal command and the autobrake right pedal command; and
    executing, by a pedal braking controller, the pedal command received from the pedal executive controller.

10. The method of claim 9, further comprising receiving, at the autobrake controller, an aircraft acceleration feedback.

11. The method of claim 9, wherein the aircraft acceleration target is received from a cockpit device.

12. The method of claim 9, further comprising receiving, at the autobrake pedal executive controller, the at least one autobrake pedal correction factor.

13. The method of claim 12, wherein executing the pedal command comprises sending a signal to an electric brake system.

14. The method of claim 12, wherein executing the pedal command comprises sending a signal to a hydraulic brake system.

15. The method of claim 9, wherein the autobrake left pedal command and the autobrake right pedal command are calculated to maintain a desired course of the aircraft.

16. The method of claim 9, further comprising receiving, at the pedal executive controller, the autobrake left pedal command and the autobrake right pedal command prior to sending the pedal command.

17. The method of claim 16, further comprising receiving, at the pedal executive controller, the pilot pedal input prior to sending the pedal command.

18. The method of claim 17, wherein the pilot pedal input comprises a pilot left pedal input and a pilot right pedal input.

19. The method of claim 9, wherein the pedal command is based on the at least one of the yaw angle, the yaw speed, or the wheel speed.

20. The method of claim 9, wherein the autobrake pedal executive controller is configured to provide automatic deceleration of the aircraft independent of the pilot pedal input.

* * * * *